United States Patent [19]

Osaki et al.

[11] 4,373,164

[45] Feb. 8, 1983

[54] DROPLET CHARGE CONDITION DETECTION IN AN INK JET SYSTEM PRINTER OF THE CHARGE AMPLITUDE CONTROLLING TYPE

[75] Inventors: Mikio Osaki, Kashihara; Sumio Kita, Nara, both of Japan

[73] Assignee: Sharp Kabushiki Kaisha, Osaka, Japan

[21] Appl. No.: 258,636

[22] Filed: Apr. 29, 1981

[30] Foreign Application Priority Data

Apr. 30, 1980 [JP] Japan ............................. 55-59153

[51] Int. Cl.[3] ......................................... G01D 18/00

[52] U.S. Cl. ................................................. 346/75

[58] Field of Search .................................... 346/75

[56] References Cited

U.S. PATENT DOCUMENTS 3,893,126 7/1975 Ascoli ............................ 346/75 X
3,953,860 4/1976 Fujimoto ............................ 346/75
4,288,796 9/1981 Aiba ................................. 346/75
4,329,695 5/1982 Aiba ................................. 346/75

*Primary Examiner*—Joseph W. Hartary
*Attorney, Agent, or Firm*—Birch, Stewart, Kolasch & Birch

[57] ABSTRACT

A charge condition detection system is provided in an ink jet system printer of the charge amplitude controlling type in order to synchronize the application of the charging signal with the droplet formation timing. The charge condition detection system includes a metal member physically connected to the ink liquid to be supplied to an ink droplet issuance unit, and a capacitor electrically connected to the metal member. When the ink droplet is properly charged, the charge amount corresponding to the charge carried by the ink droplet is accumulated on the capacitor. By measuring the voltage appearing across the capacitor, the charge condition of the ink droplet is detected.

9 Claims, 6 Drawing Figures

FIG. 1
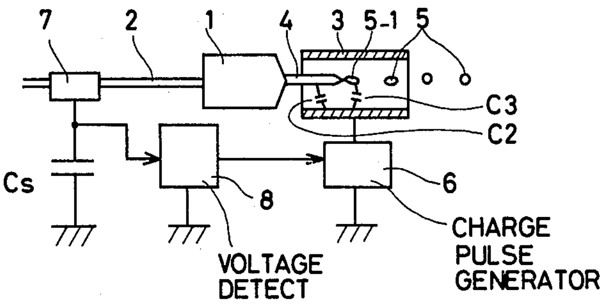
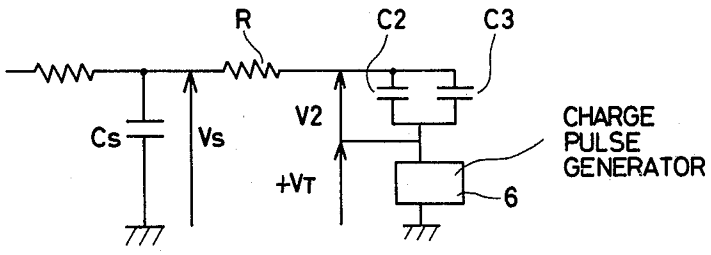
FIG. 2

DROPLET CHARGE CONDITION DETECTION IN AN INK JET SYSTEM PRINTER OF THE CHARGE AMPLITUDE CONTROLLING TYPE

BACKGROUND AND SUMMARY OF THE INVENTION

The present invention relates to an ink jet system printer of the charge amplitude controlling type and, more particularly, to a droplet charge condition detection system in an ink jet system printer of the charge amplitude controlling type.

An ink jet system printer of the charge amplitude controlling type includes an ink droplet issuance unit to which an electromechanical transducer is attached to vibrate the ink droplet issuance unit at a given frequency, thereby forming the ink droplet at the given frequency. The ink droplet is charged by a charging tunnel in accordance with a print data, and the thus charged ink droplet is deflected in accordance with the charge amount carried thereon while it passes through a constant high voltage deflection field established by a pair of deflection electrodes. The thus deflected ink droplet is directed to a recording paper to print a desired pattern in a dot matrix fashion.

In such an ink jet system printer of the charge amplitude controlling type it is strictly required that the application of the charging signal is timed in agreement with the droplet formation timing. If the charging signal application is not synchronized with the droplet formation, an accurate printing can not be ensured. Further, the droplet formation timing is variable depending on the ambience condition even when the ink jet system printer continuously operates. Therefore, a system is required to determine whether the application of the charging signal is timed in agreement with the droplet formation timing.

It is conventional in an ink jet system printer of the charge amplitude controlling type that phase detecting dots are provided in addition to the ink droplets contributing to the actual printing operation in order to detect whether the ink droplets are properly charged by the charging signal. To detect the charge condition of the phase detecting dots, the conventional ink jet system printer includes a charge amplitude detection electrode disposed at the downstream of the charging tunnel for detecting the charge voltage through the use of the electrostatic induction. A typical construction of the charge amplitude detection electrode is disclosed in U.S. Pat. No. 3,953,860, Charge Amplitude Detection for Ink Jet System Printer, issued on Apr. 27, 1976. Such a detection system is not practical because it is very difficult to maintain the charge amplitude detection electrode at a high impedance condition.

A novel charge condition detection system is proposed in copending application Ser. No. 917,592, Phase Detection in an Ink Jet System Printer of the Charge Amplitude Controlling Type, filed on June 21, 1978 by Masahiko Aiba and Ikuo Umeda and assigned to the same assignee as the present application, now U.S. Pat. No. 4,288,796 issued Sept. 8, 1981, wherein a detection system is provided for detecting an electric current which will flow from the nozzle to the ink liquid when application of a phase detection signal to a charging tunnel is timed in agreement with a droplet formation phase. More specifically, a resistor is connected to the nozzle, and the detection system is connected to the resistor for detecting a voltage across the resistor which is representative of the above-mentioned electric current. The detection system disclosed in Ser. No. 917,592 is not practical because the detection output includes large level noises.

An improvement over the detection system disclosed in Ser. No. 917,592 is proposed in copending application Ser. No. 124,850, Charge Timing Evaluation in an Ink Jet System Printer of the Charge Amplitude Controlling Type, filed on Feb. 26, 1980 by Masahiko Aiba and assigned to the same assignee as the present application now U.S. Pat. No. 4,329,695 issued May 11, 1982. In the detection system disclosed in Ser. No. 124,850, an alternating current signal is obtained from the electric current flowing from the nozzle to the ink liquid when the ink droplets are properly charged by the charging tunnel. However, the alternating current signal includes a large amount of noise component.

Accordingly, an object of the present invention is to provide a charge condition detection system in an ink jet system printer of the charge amplitude controlling type.

Another object of the present invention is to provide a charge current detection system which develops a detection output of a high S/N ratio.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a detection electrode is disposed in an ink liquid supply system to contact the ink liquid. A capacitor is connected to the detection electrode so that the capacitor accumulates charges corresponding to the charges applied to the ink droplets by a sequence of phase detection charging signals. A detection circuit is connected to the capacitor to remove the noise component, thereby obtaining a D.C. detection signal. In a preferred form, the detection circuit includes a low-pass filter for removing the noise component.

BRIEF DESCRIPTION OF THE DRAWINGS

The present invention will be better understood from the detailed description given hereinbelow and the accompanying drawings which are given by way of illustration only, and thus are not limitative of the present invention, and wherein:

FIG. 1 is a block diagram of an embodiment of a charge condition detection system of the present invention;

FIG. 2 is a circuit diagram of an equivalent circuit of the charge condition detection system of FIG. 1;

DESCRIPTION OF THE PREFERRED EMBODIMENTS

Figure 3:
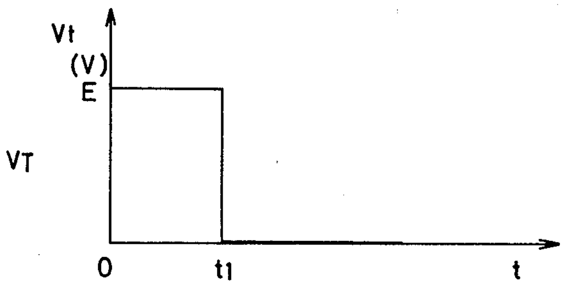
FIGS. 3 and 4 are waveform charts for explaining an operation mode of the charge condition detection system of FIG. 1.

An ink droplet issuance unit 1 is supplied with an ink liquid from a pump through a conduit 2. An electromechanical transducer is attached to the ink droplet issuance unit 1 to vibrate the ink droplet issuance unit 1 at a given frequency, thereby forming ink droplets 5 at the given frequency. A charging tunnel 3 is disposed in front of the ink droplet issuance unit 1 to charge the ink droplets 5 in accordance with a print data. More specifically, the charging tunnel 3 functions to apply a predetermined charge to the ink droplet 5 when an ink droplet 5-1 is separated from a solid ink 4 emitted from the ink droplet issuance unit 1. A charge pulse generator 6 is connected to the charging tunnel 3 for applying a print charge pulse in accordance with the print data or applying a search pulse for performing a charge condition detection operation. The pulse generator 6 receives a charge condition detection output when the search pulse is developed from the charge pulse generator 6, thereby fixing the pulse phase when the charge condition detection output indicates an optimum phase relationship. The print charge pulse is developed in the thus fixed phase.

The charging operation is performed in the following manner. When a charge pulse (+V) is applied to the charging tunnel 3, a negative charge is induced in the solid ink 4. The negative charge is also induced in the ink droplet 5-1 which is preparing to separate from the solid ink 4. Under these conditions when the ink droplet 5-1 is separated from the solid ink 4, the induced charge is carried by the ink droplet 5-1. If the application of the charge pulse (+V) is terminated before the separation of the ink droplet 5-1, the ink droplet 5 never carries the charge. Accordingly, the ink droplet separation timing can be observed when the charge amount applied to the ink droplet 5 is detected.

A metal member 7 is included in the conduit 2 so that the metal member 7 contacts the ink liquid contained in the conduit 2. Usually, the conduit 2 includes a coupler for facilitating the exchange of the ink droplet issuance unit 1. A metal filter is included in the coupler and, therefore, the metal member 7 can be the metal filter included in the coupler disposed in the ink liquid supply system. A capacitor $C_s$ is connected to the metal member 7 for detecting the above-mentioned charge amount applied to the ink droplet 5.

A voltage level appearing across the capacitor $C_s$ is detected by a voltage detection circuit 8. More specifically, when the application of the search pulse is timed in agreement with the droplet separation phase, a charge is accumulated on the capacitor $C_s$, the charge being the same amount as the charge amount carried by the ink droplet 5 and the polarity opposite to that carried by the ink droplet 5. Accordingly, the voltage appearing across the capacitor $C_s$ indicates the charge amount carried by the ink droplet 5. The voltage level detected by the voltage detection circuit 8 is compared with a reference voltage level to develop a phase correct detection signal or a phase incorrect detection signal. The thus obtained phase correct/incorrect detection signal is applied to the charge pulse generator 6. When the phase correct detection signal is applied to the charge pulse generator 6, the charge pulse generator 6 functions to fix the pulse phase for developing the print charge pulse in the fixed phase. When the phase incorrect detection signal is applied to the charge pulse generator 6, the charge pulse generator 6 functions to shift the phase of the search pulse till the phase correct detection signal is developed from the voltage detection circuit 8. In this way, the proper phase relationship is obtained by detecting the voltage appearing across the capacitor $C_s$.

FIG. 2 shows an equivalent circuit of the charge condition detection system of FIG. 1. Like elements corresponding to those of FIG. 1 are indicated by like numerals.

An electrostatic capacitance $C_2$ is formed between the charging tunnel 3 and the solid ink 4, and an electrostatic capacitance $C_3$ is formed between the charging tunnel 3 and the ink droplet 5-1 preparing to separate from the solid ink 4. A resistor R represents a resistance of the ink liquid disposed between the ink droplet 5-1 and the metal member 7 to which the capacitor $C_s$ is connected.

When a search pulse $+V_T$ is applied from the charge pulse generator 6 to the charging tunnel 3, a negative charge determined by the above-mentioned electrostatic capacitance $C_2+C_3$ is induced in the solid ink 4. The induced charge amount (q) is $V_2(C_2+C_3)$ coulombs, where $V_2$ represents a voltage level appearing across the capacitor $C_2$ or the capacitor $C_3$. The ink droplet 5-1 carries the charge amount $-q_3$ $(=C_3V_2)$ coulombs. Therefore, the positive charge amounting to the same value as carried by the ink droplet 5-1 is accumulated on the capacitor $C_s$. A voltage $V_s$ appears across the capacitor $C_s$ due to the charge $q_3$.

$$V_s = \frac{q_3}{C_s + C_2} \text{ (volts)}$$

When $C_s >> C_2$, the voltage $V_s$ can be represented as follows:

$$V_s \approx \frac{q_3}{C_s} = \frac{C_3 V_2}{C_s} \text{ (volts)}$$

However, if the application of the search pulse is not timed in agreement with the droplet separation timing, the ink droplet 5-1 does not carry the charge and, hence, the above-mentioned voltage does not appear across the capacitor $C_s$. Attention should be directed to the fact that the charge amount $q_3$ derived from one ink droplet 5-1 is so small that an accurate detection is not ensured. When a predetermined number of succeeding ink droplets 5 are charged by the search pulse, the voltage $V_s$ becomes n $(q_3/C_s)$ volts in case where succeeding n ink droplets are accurately charged by the search pulse.

In an example where n=50, $C_s$=1000 pF, and $q_3 \approx 0.34 \times 10^{-12}$ coulombs, the voltage $V_s$ appearing across the capacitor $C_s$ is about 17 millivolts.

In an actual system, the voltage $V_s$ is about 3 millivolts. This difference is mainly caused by a discharge resistor connected to the capacitor $C_s$ in a parallel fashion. The discharge resistor is required for clearing the charge accumulated on the capacitor $C_s$, thereby preparing for the next detection. The discharge resistor can be replaced by a switching means. The thus obtained voltage $V_s$ is amplified by the voltage detection circuit 8 to 500 through 600 time value which is suited for the TTL control.

Since the search pulse $V_T$ is developed in the pulse fashion, noises appear across the capacitor $C_s$ in addition to the voltage signal to be detected. In order to minimize the influence caused by the noises it is preferable that the voltage $V_s$ is detected at a time sufficiently after the completion of application of the search pulse $V_T$. More specifically, the voltage detection should be conducted at a time after than the time constant $(C_2+C_3).R$ counted from the trailing edge of the last search pulse $V_T$.

When the pulse shaped search pulse $V_T$ is applied to the charging tunnel 3, the transient voltage including the noise component appears across the capacitor $C_s$. The noise component is considerably greater than the signal component.

When one search pulse $V_T$ of a pulsewidth $t_1$ (sec) and having a voltage level E (volt) is applied to the charging tunnel 3, the voltage $V_s$ appearing across the capacitor $C_s$ can be represented as follows when the ink liquid resistance is R (ohm).

$$V_s(S) = \frac{\frac{C_{23}}{C_{23}+C_s} \times V_T(S)}{ST+1} \simeq \frac{C_{23}}{C_s} \cdot \frac{V_T(S)}{ST+1}$$

where:

$$C_{23} = C_2 + C_3'$$

$$T = \frac{C_s R}{1 + \frac{C_s}{C_{23}}} \simeq C_{23}R \; (\because C_{23} << C_s)$$

S: Laplacian (Laplace's operation)

$$V_T(S) = \frac{E}{S}(1 - e^{-st1})$$

Accordingly, $$V_s(S) = \frac{C_{23}}{C_s} \cdot E \cdot \frac{1}{T}\left(\frac{1}{S\left(S+\frac{1}{T}\right)} - \frac{e^{-st1}}{S\left(S+\frac{1}{T}\right)}\right)$$

Therefore, $$V_s(t) = \zeta^{-1} V_s(S)$$

$$= \frac{C_{23}}{C_s} \cdot \frac{E}{T}\left[T - \left(1 - e^{-\frac{t}{T}}\right) - T \cdot \left(1 - e^{-\frac{t-t1}{T}}\right) \cdot U(t-t1)\right]$$

$$= \frac{C_{23}}{C_s} \cdot E\left[1 - U(t-t1) + e^{-\frac{t}{T}}\left(-1 + e^{\frac{t1}{T}} U(t-t1)\right)\right]$$

Figure 4:
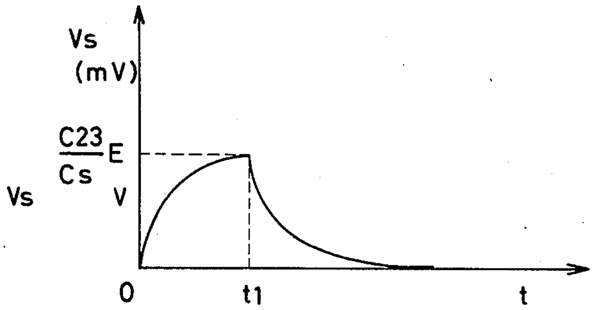

FIG. 3 shows the search pulse $V_T$ and FIG. 4 shows the voltage $V_s$ caused by one search pulse $V_T$. The voltage $V_s$ includes the noise component which is far greater than the signal component. The peak value of the voltage $V_s$ is $$\frac{C_{23} \cdot E}{C_s},$$

which is about 19 millivolts (p-p) when $C_{23} \simeq 27 \times 10^{-13}$ F, $C_s = 1000$ pF and $E = 70$ volts. The signal component is a D.C. voltage which remains on the capacitor $C_s$ at a predetermined time subsequent to the trailing edge of the search pulse $V_T$ by a period determined by a time constant. When a train of the search pulses is applied to the charging tunnel 3, the signal component can be increased without increasing the noise component.

Figure 5:
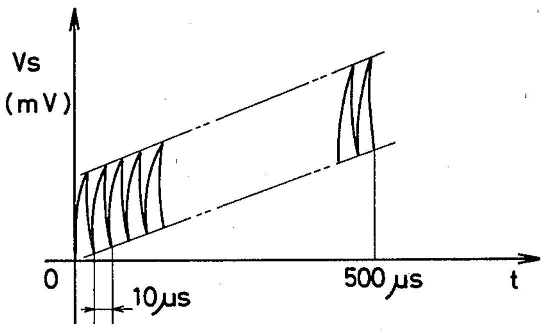
FIG. 5 is a waveform chart showing an output current obtained in the charge condition detection system of FIG. 1.

When the search pulse $V_T$ of 100 KHz is applied to the charging tunnel 3 by 50 times with interval of 10 μs, the charges are accumulated on the capacitor $C_s$ in a fashion as shown in FIG. 5. It will be clear from FIG. 5 that the signal component, D.C. voltage increases but the noise component is held at a fixed value.

The thus obtained voltage signal is compared with a reference voltage level to determine whether the application of the search pulse is timed in agreement with the droplet formation timing as already discussed above. When the phase correct detection signal is developed from the voltage detection circuit 8, the charge pulse generator 6 fixes the phase to develop the print charge signal in the fixed phase. When the phase incorrect detection signal is developed from the voltage detection circuit 8, the charge pulse generator 6 functions to shift the phase of the search pulse till the phase correct detection signal is developed from the voltage detection circuit 8.

Figure 6:
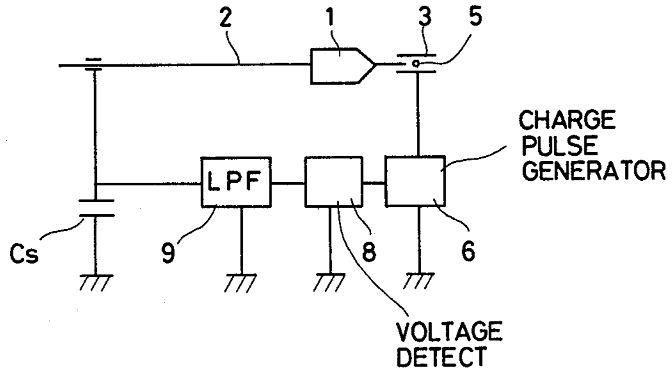
FIG. 6 is a block diagram of another embodiment of the charge condition detection system of the present invention.

FIG. 6 shows another embodiment of the charge condition detection system of the present invention. Like elements corresponding to those of FIG. 1 are indicated by like numerals.

A low-pass filter 9 is disposed in front of the voltage detection circuit 8 for removing the noise component which is an alternating current signal.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A charge condition detection system in an ink jet system printer of the charge amplitude controlling type which comprises an ink droplet issuance means for emitting ink droplets at a given frequency and charging tunnel means for charging said ink droplets in accordance with print information or by a phase detection search pulse, said charge condition detection system comprising:

detection electrode means disposed in an ink liquid supply system near said ink droplet issuance means and contacting an ink liquid to be supplied to said ink droplet issuance means;

capacitor means connected to said detection electrode means for accumulating charges corresponding to charges carried by said ink droplets charged by said charging tunnel means; and voltage detection means for detecting a voltage appearing across said capacitor means as a function of charges accumulated thereby.

2. The charge condition detection system of claim 1, said voltage detection means including means for removing noise components included in said voltage appearing across said capacitor means.

3. The charge condition detection system of claim 1 or 2, wherein said voltage detection means detects the voltage appearing across said capacitor means at a predetermined time subsequent to the occurrence of the trailing edge of said phase detection search pulse.

4. The charge condition detection system of claim 1 or 2, wherein said voltage detection means includes:

low-pass filter means for removing an alternating current signal component from said voltage appearing across said capacitor means.

5. The charge condition detection system of claim 1 or 2, wherein said voltage detection means performs a detection operation after a predetermined number of phase detection search pulses are sequentially applied to said charging tunnel.

6. The charge condition detection system of claim 1 or 2, wherein said voltage detection means detects the voltage appearing across said capacitor means at a predetermined time subsequent to the occurrence of the trailing edge of said phase detection search pulse; and wherein said voltage detection means performs a detection operation after a predetermined number of phase detection search pulses are sequentially applied to said charging tunnel.

7. The charge condition detection system of claim 1 or 2, wherein said voltage detection means detects the voltage appearing across said capacitor means at a predetermined time subsequent to the occurrence of the trailing edge of said phase detection search pulse; and wherein said voltage detection means includes:

low-pass filter means for removing an alternating current signal component from said voltage appearing across said capacitor means.

8. The charge condition detection system of claim 1 or 2, wherein said voltage detection means includes:

low-pass filter means for removing an alternating current signal component from said voltage appearing across said capacitor means; and wherein said voltage detection means performs a detection operation after a predetermined number of phase detection search pulses are sequentially applied to said charging tunnel.

9. The charge condition detection system of claim 1 or 2, wherein said voltage detection means detects the voltage appearing across said capacitor means at a predetermined time subsequent to the occurrence of the trailing edge of said phase detection search pulse; wherein said voltage detection means includes:

low-pass filter means for removing an alternating current signal component from said voltage appearing across said capacitor means; and wherein said voltage detection means performs a detection operation after a predetermined number of phase detection search pulses are sequentially applied to said charging tunnel.

* * * * *